Nov. 20, 1945.    H. L. DICK    2,389,185
APPARATUS FOR THE PURIFICATION OF WATER
Filed Feb. 12, 1943
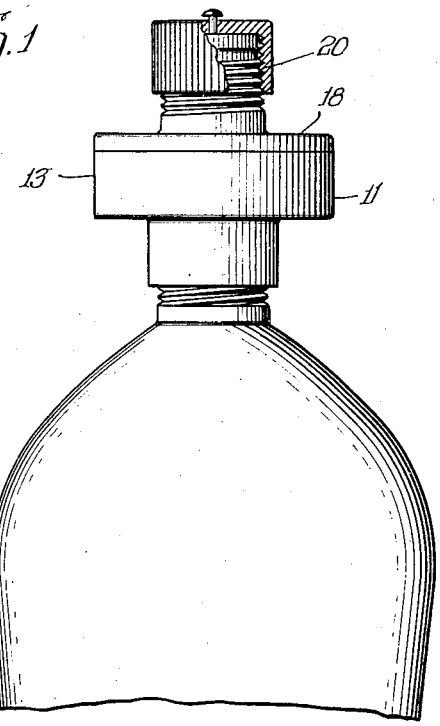
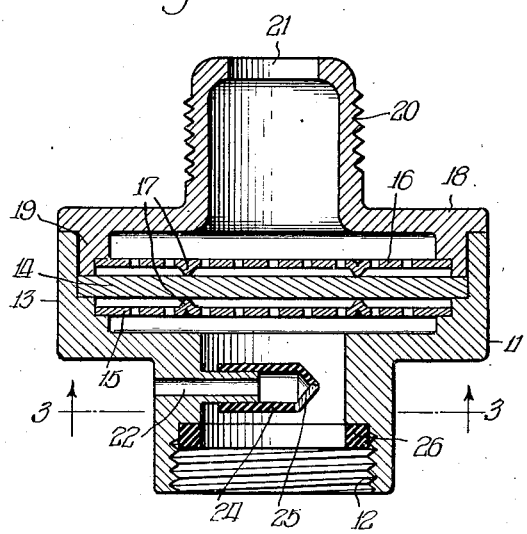
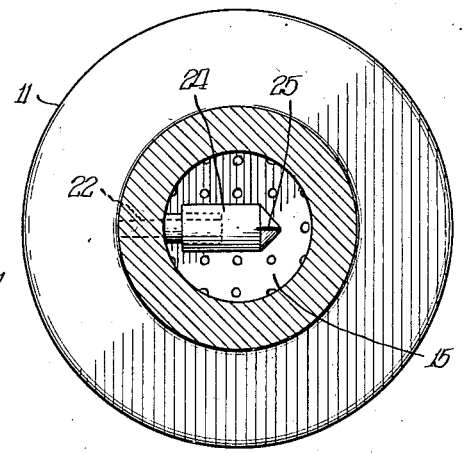
INVENTOR.
Herbert L. Dick,
BY
Cromwell, Greist + Warden
ATTYS.

Patented Nov. 20, 1945

2,389,185

UNITED STATES PATENT OFFICE 2,389,185

APPARATUS FOR THE PURIFICATION OF WATER

Herbert L. Dick, Barrington, Ill., assignor to Tested Appliance Company, Chicago, Ill., a corporation of Nevada Application February 12, 1943, Serial No. 475,612

5 Claims. (Cl. 210—62)

The present invention relates to apparatus for the purification of water in and from relatively small containers such as canteen or other bottle-like containers which might be filled with surface water.

The invention is useful by travellers or troops that pass through areas where there is no available purified water, such as a municipal water supply.

In connection with troops, it is very often the fact that a few men will be located a considerable distance from their base of operations and while it is the practice to supply these men with food, the water supply problem is serious because the only water that they may have available may be contaminated water on the surface of the ground.

In utilizing the invention the canteen is filled with the nearest water available, no matter what its condition, although presumably the user would select the best water that he could obtain. The water is then treated with a sterilizing agent, such as chlorine. For example, a chlorine tablet may be used that would impart even five or more parts of chlorine per million to the water. A high chlorine concentration will kill substantially all of the detrimental organisms, but obviously the water might not be clear and would be unpalatable. In order to impart palatability to the water after it has been treated with chlorine, an active carbon may be introduced to the water, which will remove the odors and undesirable tastes. The present apparatus is adapted to be fitted on the canteen to filter from the water the active carbon particles plus other solids, such as dirt and the like.

In the drawing:

Fig. 1 is a view in elevation showing a canteen with the ordinary cap of the canteen placed on the top of the filter unit;

Fig. 2 is a sectional view of the filter unit; and

Fig. 3 is a section taken on line 3—3 of Fig. 2.

From the drawing it will be apparent that the device comprises a body portion 11, which is provided at its base with an interior screw threaded portion 12 that is adapted to screw upon the canteen in place of the regular cap. The body portion 11 is enlarged at its central portion 13 to receive a filter member 14. The filter member 14 may be made of paper or other material, the interstices of which are sufficiently fine to filter out a substantial portion of the solids so as to provide a clear water, but are sufficiently coarse to permit a relatively free flow of water through the filter. On each side of the filter member 14 there are mounted drainage members 15 and 16, respectively, that are perforated and preferably provided with corrugations or projecting portions 17 that provide an adequate drainage space around the filter member and through the openings in the drainage members 15 and 16. As is apparent from the drawing, the body portion of the device is provided with recesses to receive the drainage members and the filter members.

The top of the device 18 is provided with a downwardly projecting annular flange 19 that may be secured to the body portion 11 either by screw threads, a bayonet slot, or some other well known means of interlock, to hold the filter and the drainage members in position. The top of the device is also provided with a screw threaded projecting portion 20 that is adapted to receive the ordinary cap of the canteen. An opening 21 is provided at the top of the device to permit the passage of the water therethrough to the mouth of the user.

In order to enable the user to drink from the device and secure a free passage of substantial quantities of water, air relief means are provided, which consist of an opening 22 to the atmosphere, the member 22 that projects from the body portion of the device into substantially the center thereof, and the valve 24. The valve 24 may be made of rubber or other flexible material, that has a slit 25 in the end thereof.

It will be apparent from the foregoing description that when the canteen is inverted for the user to drink therefrom, the water consumed must be replaced in the canteen by something, otherwise a vacuum will occur reducing outflow of water or preventing it completely. As this water is removed from the canteen in the structure shown, air freely enters through the members 22, 24 and through valve slit 25, thus permitting water to flow readily from opening 21. The provision of means for introduction of air to the canteen is a matter of great importance because it is impossible to provide sufficient air through the opening 21 and the filter to provide a sufficient rate of flow during the drinking period.

The valve member 24 is so constructed that it prevents leakage of water as the slit 25 will close should water tend to flow through the opening 22.

A sealing gasket 26 is provided so as to seal the mechanism to the canteen.

In the use of the device it is preferable that immediately after the raw water is put into the canteen and a sterilizing agent added, the filter mechanism be also placed upon the canteen and the cap of the canteen be screwed on at 20 so that by shaking the canteen the sterilizing agent not only comes in contact with the body portion of the canteen, but also with the filter, thereby obtaining substantial sterilization of the entire device. The apparatus may then be removed and an active carbon substance be inserted for the purpose of removing the tastes and smells, etc.

In certain cases, in addition to the sterilizing agent and the active carbon, it may also be preferable to include a filter aid, such as diatomaceous earth, which may be mixed with the sterilizing agent or the active carbon.

By the use of the apparatus and process herein described it is possible to provide a clarified as well as purified water from a contaminated source in relatively small quantities. This is a great advantage because it enables troops or others to provide themselves with a clear, pure water which has a good taste, free from any substantial quantities of solids, from a source of water which normally would be highly dangerous as well as unpleasant to drink.

I claim:

1. In combination with a canteen, water purification apparatus comprising a hollow body portion fitted to said canteen and having an inlet and an outlet, a filter and drainage elements spaced from each other and mounted in said body portion between said inlet and outlet, means connected with said hollow body portion for introducing air to the body of the canteen, said means being positioned within an air introducing chamber between said filter element and said canteen, and said filter element consisting of a filter paper pad having interstices formed by closely compacted fibrous material which will prevent the passage of solid particles but which will permit a relatively free flow of water therethrough, the interstices being so fine as to make it impossible to provide enough air through said outlet and through said filter to provide a sufficient rate of flow of water therethrough during the drinking period without the aid of said air introducing means within said air introducing chamber.

2. In combination with a canteen, water purification apparatus comprising a hollow body portion fitted to said canteen and having an inlet and an outlet, a filter element mounted in said body portion between said inlet and outlet, means connected with said hollow body portion for introducing air to the body of the canteen, said means being positioned within an air introducing chamber between said filter element and said canteen, and a valve member cooperatively associated with said last named means within said chamber, and said filter element consisting of a pad having interstices formed by closely compacted fibrous material which will prevent the passage of solid particles but which will permit a relatively free flow of water therethrough, the interstices being so fine as to make it impossible to provide enough air through said outlet and through said filter to provide a sufficient rate of flow of water therethrough during the drinking period without the aid of said air introducing means within said air introducing chamber.

3. In combination with a canteen, water purification apparatus comprising a hollow body portion fitted to said canteen and having an inlet and an outlet, said body portion having means for securing the apparatus to the top of the canteen, a filter element mounted in said body portion between said inlet and said outlet, and means connected within said hollow body portion for introducing air to the canteen comprising an air inlet member positioned between said filter element and the canteen and a one-way valve member to permit the passage of air into the canteen and to prevent the escape of water therefrom connected to said air inlet member within an air introducing chamber, said filter element comprising a filter pad having interstices formed by closely compacted fibrous material which will prevent the passage of solid particles but which will permit a relatively free flow of water therethrough, said interstices being so fine as to make it impossible to provide enough air through said outlet and through said filter to provide a sufficient rate of flow of water therethrough during the drinking period without the aid of said air introducing means within said air introducing chamber.

4. In combination with a canteen, water purification apparatus comprising a hollow body portion fitted to said canteen and having an inlet and an outlet, said body portion having means for securing it to the canteen and a top portion having an opening therein to permit the passage of water for drinking purposes, a filter element mounted in said body portion between said inlet and outlet, means connected in said hollow body portion for introducing air to the canteen, said air introducing means being positioned between said filter element and the portion of the apparatus attached to the canteen and having a flexible check-valve member having a closeable slit in its end portion, which valve member is connected to said air inlet member within an air introducing chamber to prevent the passage of water through said air inlet member and to permit the passage of air into said canteen, said filter element consisting of a pad having interstices formed by closely compacted fibrous material which will prevent the passage of solid particles but which will permit a relatively free flow of water therethrough, said interstices being so fine as to make it impossible to provide enough air through said outlet and through said filter to provide a sufficient rate of flow of water therethrough during the drinking period without the aid of said air introducing means within said air introducing chamber.

5. In combination with a canteen, water purification apparatus comprising a hollow body portion fitted to said canteen and having an inlet and an outlet, said body portion having means for securing it to said canteen, and a top portion having an opening therein to permit the passage of water for drinking purposes, said top portion being adapted to receive the cap of the canteen, a filter element mounted between the top of said body portion constituting the outlet and the bottom of the body portion thereof to be attached to the canteen constituting the inlet, the outside diameter of said outlet being the same as the inside diameter of said inlet, means connected within said body portion for introducing air to the canteen, said air introducing means being positioned within an air introducing chamber between said filter element and the portion of the apparatus attached to the canteen and having a valve member connected to the air inlet member to prevent the passage of water through the air inlet member, said filter element consisting of a filter pad having interstices formed by closely compacted fibrous material which will prevent the passage of solid particles but which will permit a relatively free flow of water therethrough, said interstices being so fine as to make it impossible to provide enough air through said outlet and through said filter to provide a sufficient rate of flow of water therethrough during the drinking period without the aid of said air introducing means within said air introducing chamber.

HERBERT L. DICK.